United States Patent
Miller et al.

(10) Patent No.: US 10,456,929 B1
(45) Date of Patent: Oct. 29, 2019

(54) NEGATIVE PRESSURE ACTUATED SOFT BENDING ACTUATOR

(71) Applicant: SCHLUMBERGER TECHNOLOGY CORPORATION, Sugar Land, TX (US)

(72) Inventors: James Miller, Boston, MA (US); Nathaniel Wicks, Somerville, MA (US)

(73) Assignee: SCHLUMBERGER TECHNOLOGY CORPORATION, Sugarland, TX (US)

(*) Notice: Subject to any disclaimer, the term of this patent is extended or adjusted under 35 U.S.C. 154(b) by 0 days.

(21) Appl. No.: 16/102,434

(22) Filed: Aug. 13, 2018

(51) Int. Cl.
*B66C 1/00* (2006.01)
*B25J 15/00* (2006.01)
*B25J 15/06* (2006.01)
*B25J 19/00* (2006.01)
*B25J 15/12* (2006.01)
*B25J 15/02* (2006.01)
*B25J 9/14* (2006.01)
*B25J 9/00* (2006.01)

(52) U.S. Cl.
CPC ........... *B25J 15/0616* (2013.01); *B25J 9/142* (2013.01); *B25J 15/0293* (2013.01); *B25J 15/12* (2013.01); *B25J 19/007* (2013.01); *B25J 9/0006* (2013.01)

(58) Field of Classification Search
CPC .......... B25J 15/0616; B25J 1/02; A63B 47/02
USPC ............................. 294/99.1, 99.2, 119.3, 183
See application file for complete search history.

(56) References Cited

U.S. PATENT DOCUMENTS

| 4,610,475 A | * | 9/1986 | Heiserman | B25J 9/1085 294/86.4 |
| 4,872,803 A | * | 10/1989 | Asakawa | B25J 9/1015 414/730 |
| 5,172,950 A | * | 12/1992 | Benecke | B25J 9/1085 219/201 |
| 9,156,570 B2 | * | 10/2015 | Lomerson, Jr. | B25J 15/0052 |
| 9,464,642 B2 | | 10/2016 | Ilievski et al. | |
| 9,737,994 B2 | * | 8/2017 | Ishikawa | B25J 15/0047 |
| 10,011,020 B2 | * | 7/2018 | Wagner | B25J 15/0023 |
| 2005/0218679 A1 | * | 10/2005 | Yokoyama | B25J 9/142 294/99.1 |

OTHER PUBLICATIONS

Yang, Dian et al, "Buckling Pneumatic Linear Actuators Inspired by Muscle", Advanced Materials Technologies, (2016) 1600055, 6 pages.
Yang, Dian et al, "Negative-Pressure Soft Linear Actuator with a Mechanical Advantage", Advanced Materials Technologies, (2016) 1600164, 6 pages.

* cited by examiner

*Primary Examiner* — Paul T Chin (57) ABSTRACT

A soft robotic bending actuator has a stiff layer bonded to a softer layer where the softer layer is a cellular solid with interconnected voids. The softer layer contracts under a negative pressure differential between the internal pressure of the actuator and its environment applied along its axial direction. The contraction results in a bending motion; i.e., an increased curvature away from the stiff layer.

15 Claims, 12 Drawing Sheets

NEGATIVE PRESSURE ACTUATED SOFT BENDING ACTUATOR

FIELD

The subject disclosure relates to robotic manipulators and grippers.

BACKGROUND

Manipulation of the surrounding environment is a fundamental robotic purpose and is a common activity across industries. Manipulation is often accomplished with specific, customized end-effectors for particular tasks and objects. An example of specific, customized manipulation is a specific torque tool utilized by remotely operated vehicles (ROV) which perform interventions on subsea manifold valves. Another approach to manipulation utilizes a hard, two or three fingered gripper which grasps an object with a high force. Complex algorithms for different types of grasps are often utilized in conjunction with the gripper in order to accomplish manipulation without damaging the item being manipulated.

A newer approach to manipulation involves using "soft robotics" which are compliant members that deform locally to accommodate object variability. Soft robotics can apply to linear actuators, locomotion, as well as whole-body architectures. Soft robotics inherently includes the tradeoff of gaining a simplified grasping algorithm while reducing maximum grasping force. A soft robotic gripper is typically implemented using a positive pressure bellows system bonded to a solid elastic beam-like element. When a positive pressure is applied to the bellows system/chamber, it expands in an axial direction. At the same time, positive pressure bellows grippers come with the safety concerns of bursting high pressure lines. In addition, limitations on the system include pump limitations and the limitation that the grippers must be fabricated with tear/puncture resistant material to prevent the gripper from "popping".

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In an embodiment, a soft bending actuator finger for use in conjunction with an evacuator is described. The soft bending actuator includes a first layer of a first elastomeric material having an outer surface and an inner surface, said first elastomeric material being relatively stiff; a second layer of a second elastomeric material, said second elastomeric material being relatively compliant relative to said first elastomeric material, said second layer of elastomeric material having a plurality of walls including an outer surface and an inner engagement surface opposite said outer surface, said second layer of elastomeric material defining a plurality of interconnected voids creating pressure equalization of the voids in the second layer and a vacuum port in one of said plurality of walls of the second layer, the vacuum port being in fluid connection with the voids and adapted to be coupled to the evacuator, said second layer bonded to said first layer of elastomeric material along said outer surface of said second layer and said inner surface of said first layer, wherein, in a first configuration where said plurality of interconnected voids are maintained at a pressure equal to an ambient environment pressure, said soft bending actuator assumes a first position, and in a second configuration where said plurality of interconnected voids are maintained at a pressure below the ambient environment pressure, said soft bending actuator assumes a second, bent position.

Additional aspects, embodiments, objects and advantages of the disclosed methods may be understood with reference to the following detailed description taken in conjunction with the provided drawings.

BRIEF DESCRIPTION OF THE DRAWINGS

FIGS. 4b, 4c, and 4d show the robotic gripper finger of FIG. 2f in representative states of actuation which are used for the plot of FIG. 4a;

DETAILED DESCRIPTION

The particulars shown herein are by way of example and for purposes of illustrative discussion of the examples of the subject disclosure only and are presented in the cause of providing what is believed to be the most useful and readily understood description of the principles and conceptual aspects of the subject disclosure. In this regard, no attempt is made to show details in more detail than is necessary, the description taken with the drawings making apparent to those skilled in the art how the several forms of the subject disclosure may be embodied in practice. Furthermore, like reference numbers and designations in the various drawings indicate like elements.

The subject disclosure relates to a soft robotic bending actuator that is activated with a negative pressure differential between the internal pressure of the actuator and its environment. The soft robotic bending actuators disclosed have application in subsea manipulation and in small or light pick-and-place manufacturing, although not limited thereto.

A soft robotic bending actuator includes a stiff layer bonded to a softer layer where the softer layer is a cellular solid with interconnected voids. The softer layer contracts under a negative pressure differential between the internal pressure of the actuator and its environment applied along its axial direction. The contraction results in a bending motion; i.e., an increased bending away from the stiff layer.

Figure 1A:
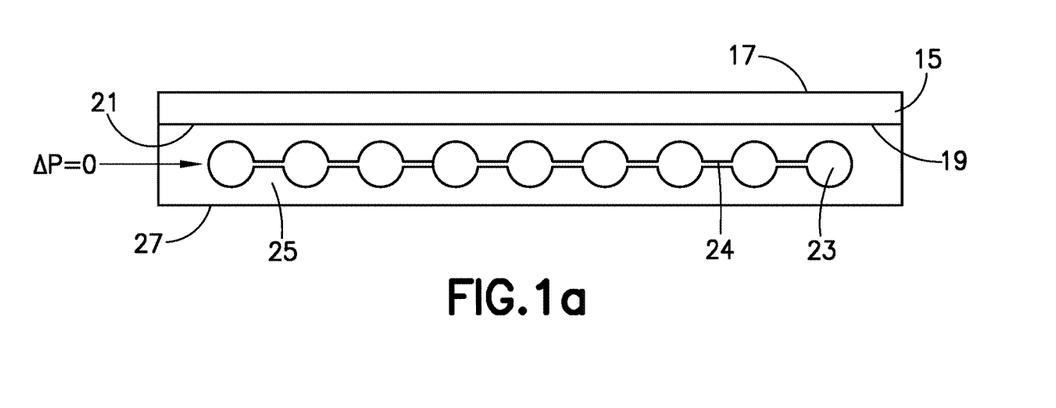
FIGS. 1a and 1b are cross-sectional diagrams of a soft robotic gripper finger in at rest and activated states.
Figure 1B:
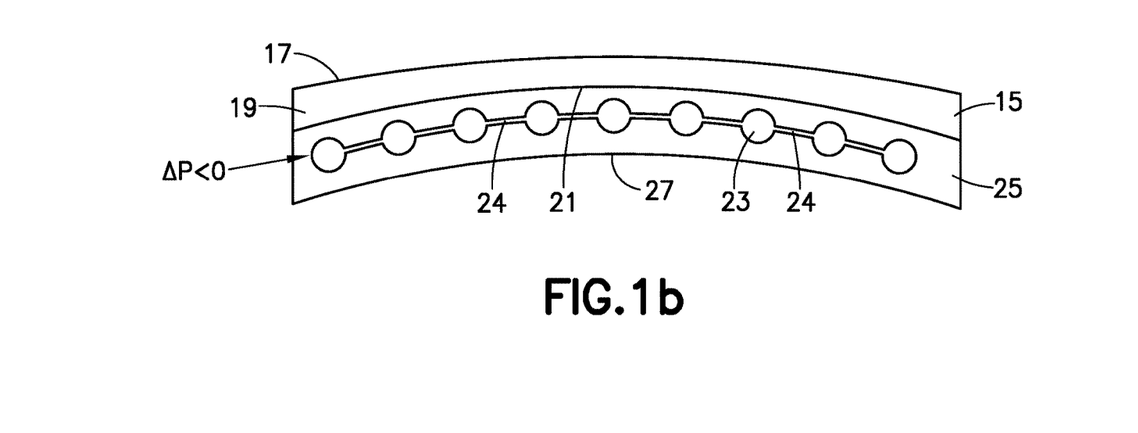

FIGS. 1a and 1b respectively provide cross-sectional diagrams of a soft robotic gripper finger in an at rest state and an activated state. As shown, the soft robotic gripper finger includes a relatively stiff, harder layer 15 of a relatively higher Young's modulus, having an outer surface 17 and an inner surface 19, with the inner surface 19 bonded to the inner surface 21 of a relatively compliant, soft layer 25. The relatively soft layer 25 of a relatively lower Young's modulus also includes an outer surface 27 that will act as the gripping surface of the finger. The relatively soft layer defines a series of voids 23 or chambers that are interconnected by channels 24.

In FIG. 1a, the soft robotic gripper finger is an at-rest state where the pressure difference between the voids 23 and the surrounding environment is zero; i.e., ΔP=0. In the at-rest state the outer surfaces and the inner surfaces of the relatively stiff and relatively compliant (flexible) layers are flat (planar). However, when the internal pressure of the relatively soft structure is decreased, i.e., ΔP<0, the voids 23 (and channels 24) shrink, such that the soft structure shortens in the longitudinal direction (axially). Because the soft structure is bonded to the stiff structure (at inner surfaces 19 and 21), the pressure reduction causes a curvature of the gripper finger with the gripping outer surface 27 of the relatively soft layer assuming a concave arrangement and the outer surface 17 of the relatively stiff layer assuming a convex arrangement. Stated in another way, the axial contraction of the softer structure caused by a shrinking of the voids is resisted by the stiff layer, resulting in a positive curvature concave away from the stiff layer. The degree of curvature as a function of pressure differential is a function of a ratio of the stiffnesses of the two layers.

Figure 2A:
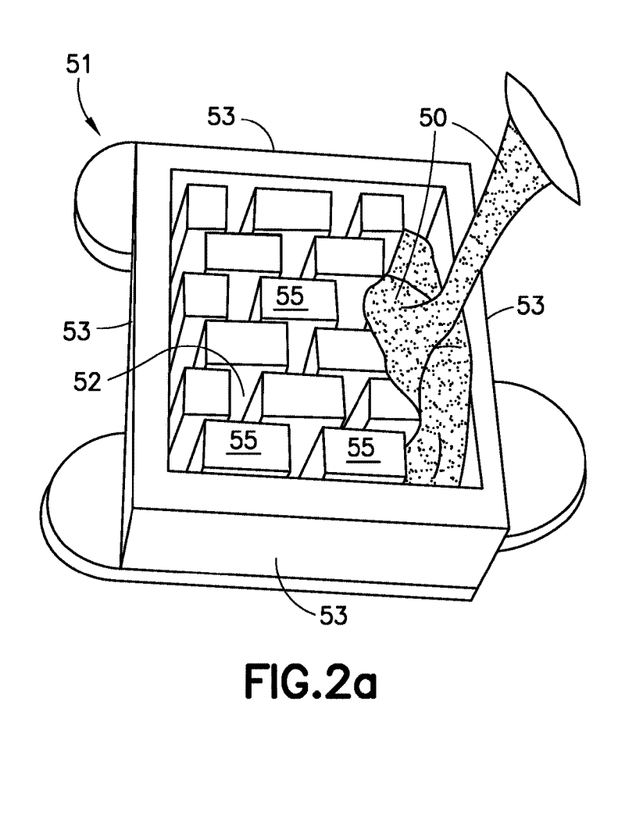
FIGS. 2a-2f are pictures showing the fabrication of a soft robotic gripper finger.

FIGS. 2a-2f show the fabrication of one embodiment of a soft robotic gripper finger. In FIG. 2a, an elastomer 50 is shown being poured into a mold 51. The mold has a bottom wall 52, four outer walls 53 that sit on the bottom forming a rectangle and a series of solid rectangles 55 that are spaced from the walls 53 in a pattern. In the specific arrangement of mold 51, there is a pattern of six rows of solid rectangles 55, with a first, third and fifth rows having two spaced solid rectangles of equal sizes, and with a second, fourth and sixth row having a first central solid rectangle of the same size as the solid rectangles of the first, third and fifth rows, and second and third central solid rectangles spaced from and on opposite sides of the first central solid rectangle, and half the size of the first central solid rectangle. The elastomer 50 is poured into the mold and moves into the spaces between the solid rectangles and between the solid rectangles and the walls and is permitted to cure. The mold 51 is filled such that the elastomer 50 also extends over the solid rectangles 55 to form a solid skin or sheet on top. After curing, the elastomer is removed from the mold.

Figure 2B:
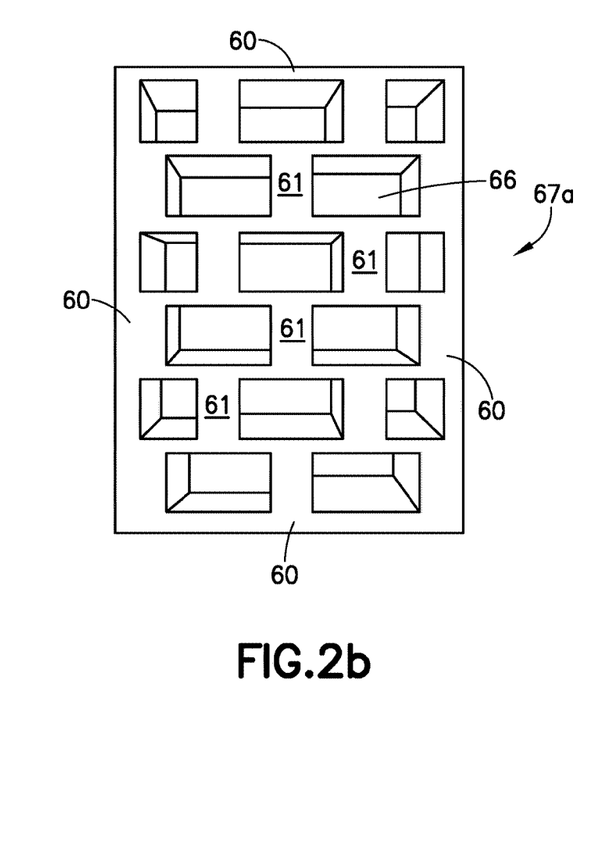

FIG. 2b shows the elastomer 50 after demolding from mold 51. The elastomer is shown to have a rectangular outer wall 60, thick columns 61, thin horizontal beams 62, and a thin sheet 66 that together define a cellular structure 67a; i.e., a structure with voids 65 that correspond to the locations of the solid rectangles 55. This arrangement promotes preferential compression along the axial (long) direction of the overall structure.

Figure 2C:
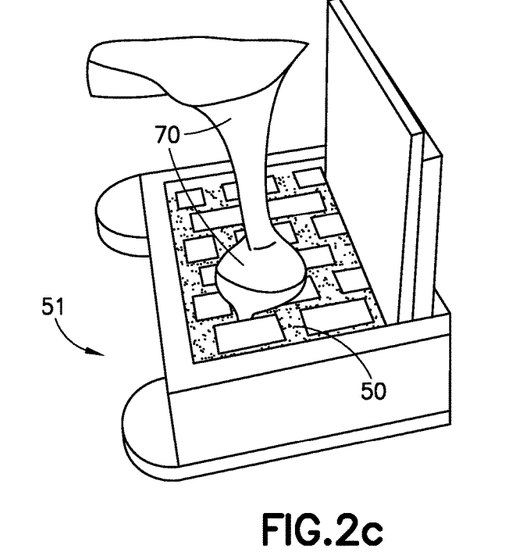

FIG. 2c shows the mold 51 refilled with additional elastomer 50 that is cured in the mold, and a second, stiffer elastomer 70 (i.e., stiffer relative to elastomer 50), being poured over the softer elastomer 50. The elastomer 70 forms a sheet 75 (FIG. 2e) over the solid rectangles 55 and the elastomer 50 and is permitted to cure. After curing, the resulting structure 67b (FIG. 2e), having a first layer having a cellular structure of the more flexible elastomer and a second (sheet) layer of the stiffer elastomer is removed from the mold.

Figure 2D:
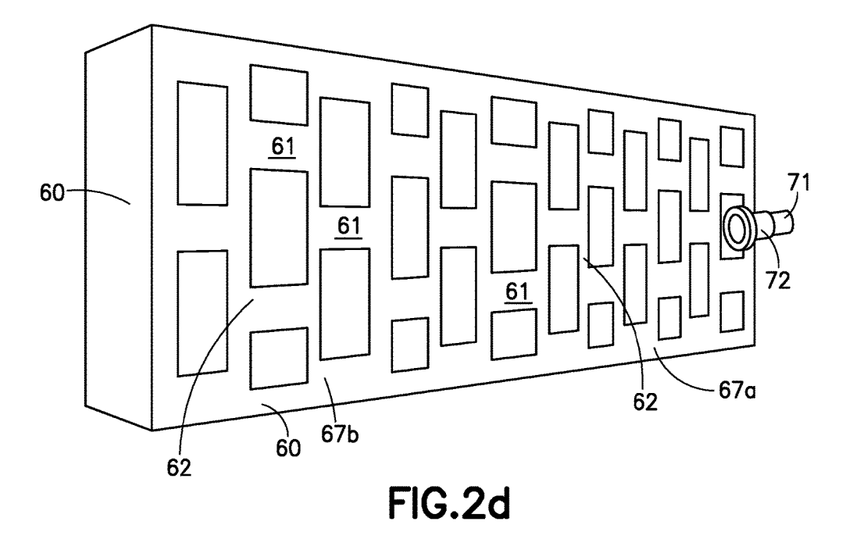

FIG. 2d shows the cured structures 67a, 67b (end-to-end). FIG. 2d also shows that a small amount of the softer elastomer 50 has been removed from the columns 61 and beams 62 of the structures, while leaving the rectangular walls 60 intact. The material is removed so that when the structures are joined as hereinafter described, the cells will be connected by a channel to allow for pressure equalization amongst all chambers. Also shown in FIG. 2d is vacuum port 71. The vacuum port 71 is inserted into a cutout 72 defined at the top of an end wall of one of the structures 67a, 67b (in this case, structure 67a).

Figure 2E:
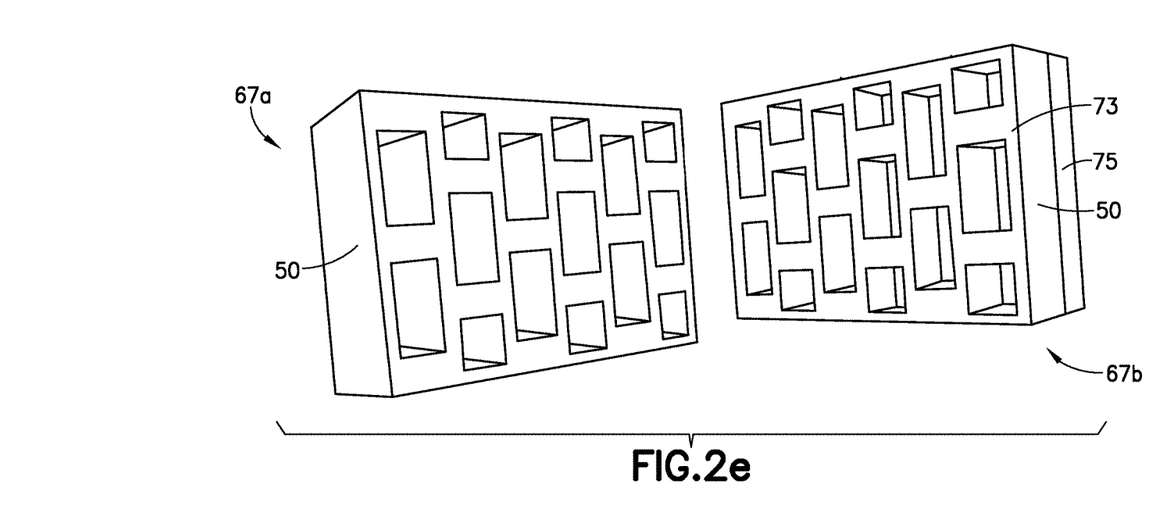
Figure 2F:
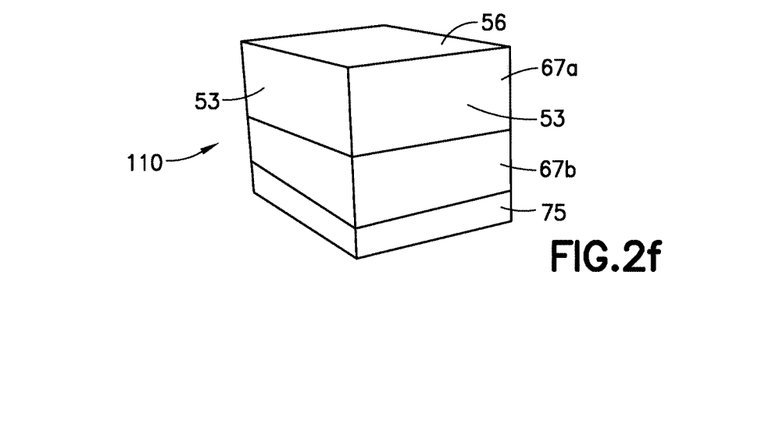

Turning now to FIG. 2e, the structures 67a, 67b are shown ready for joining along the outer edges of their open faces. As previously mentioned, structure 67a is made entirely from the relatively softer, compliant polymeric material, while structure 67b is made from a layer of the relatively softer, compliant polymeric material and a layer of the relatively stiffer (higher Young's modulus) polymeric material. A glue or other bonding material 73 may be applied along the non-skin surfaces (i.e., open faces) of the rectangular outer walls 60 of one or both of structures 67a, 67b to join the structures. Alternatively, a "paint" of the elastomer 50 may be applied to the non-skin surfaces of the rectangular outer walls 60 and allowed to cure. Regardless, when joined, and as seen in FIG. 2f, a gripper finger 110 is formed having a relatively stiff, harder, solid layer (sheet 75), and a relatively soft, compliant cellular layer (67a, 67b) defining interconnected rectangular voids or chambers, and surrounded by air tight solid outer walls 53 and a skin 56. As described hereinafter, the skin 56 will act as the gripping surface of the gripper finger 110.

Figure 3A:
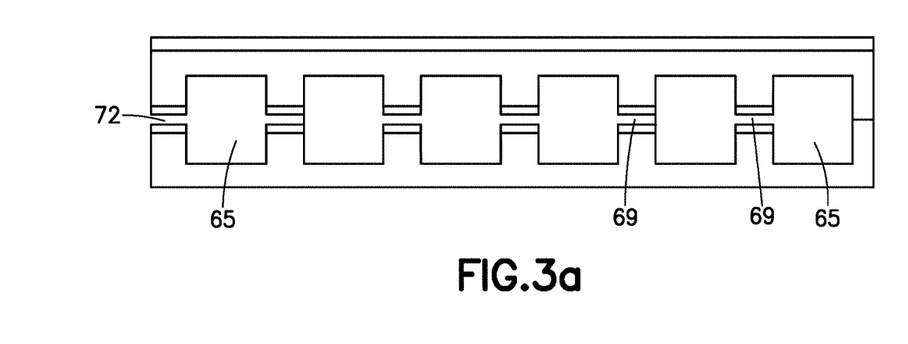
FIGS. 3a and 3b are cross-sectional diagrams of the fabricated soft robotic gripper finger of FIG. 2f in an at rest state and an activated state.
Figure 3B:
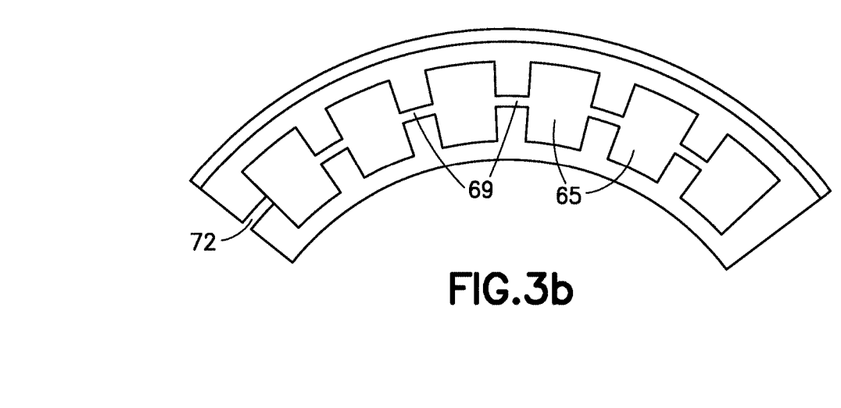

FIGS. 3a and 3b are cross-sectional diagrams of the fabricated soft robotic gripper finger of FIG. 2f along a long axis, with FIG. 3a showing the finger 110 in an at-rest state, and FIG. 3b showing finger 110 in an activated (bent) state. Chambers 65 (voids) are shown connected by channels 69 which terminate in a port cut-out 72, all of which were generated by removal of material as was previously discussed with reference to FIG. 2d. Port 71 is not shown for purposes of clarity.

Figure 4A:
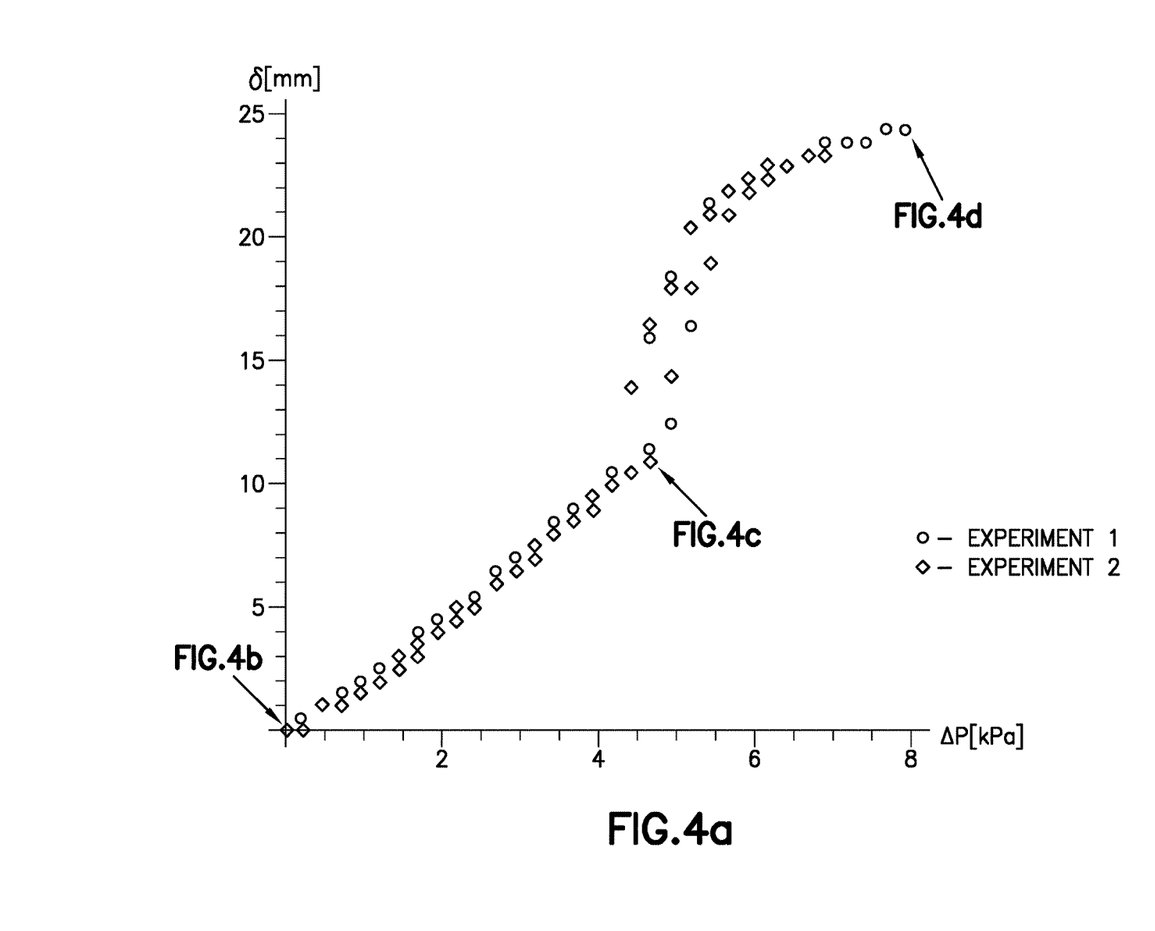
FIG. 4a is a plot of the actuation behavior of the soft robotic gripper finger of FIG. 2f.

FIG. 4a is a plot of the actuation behavior of the soft robotic gripper finger 110 of FIG. 2f, where the gripper finger 110 was formed with a 1.5 mm thick stiffer layer 75 having a Young's modulus of approximately 1290 kPa, and a 34 mm thick compliant cellular layer 67a, 67b having a solid component Young's modulus of approximately 220 kPa (it being noted that the term "approximately" is to be understood herein to mean±10%). The wall thickness of the soft compliant layer (as well as the skin thickness) is 1.5 mm, while the columns (running parallel the long axis of the gripper) are 4 mm thick, and the thin beams (running perpendicular the long axis of the gripper) are 1.5 mm thick. The overall size of the gripper finger is 34 mm wide by 93 mm long. FIG. 4a shows the horizontal displacement of the stiff-side free-end tip of the actuator as a function of negative pressure (vacuum) applied relative to the ambient for two experiments. Lateral deflection of the structure is used as a proxy for curvature. As seen in FIG. 4a, lateral deflection increases approximately linearly with change the negative change of pressure initially, followed by a sudden increase in deflection, followed by a plateauing. A small hysteresis loop can be observed after the large jump in deflection which is associated with a local buckling of the structure. The transition from linear to nonlinear behavior can be predicted using the mechanics of elastic solids to predict the elastic buckling limit stress for dense cellular solids. The plateau is believed to be the densification limit where cellular solids begin to behave more like their solid material. Overall behavior is highly repeatable between the two tests and hysteresis is minimal in the linear regime.

Figure 4B:
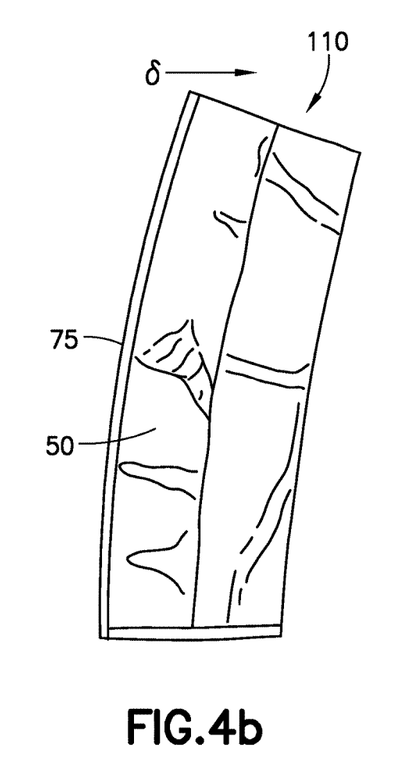
Figure 4C:
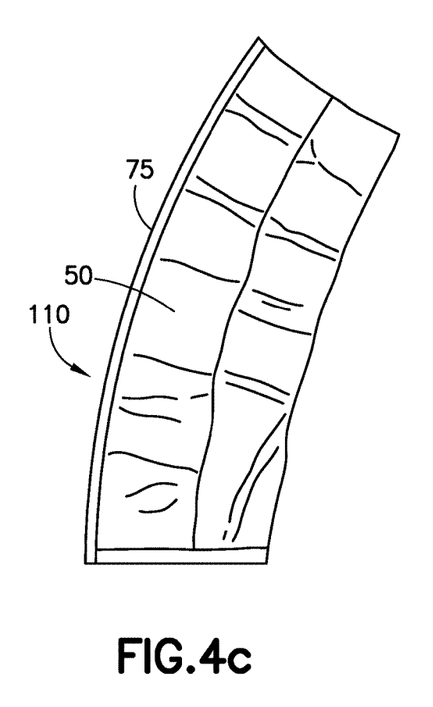
Figure 4D:
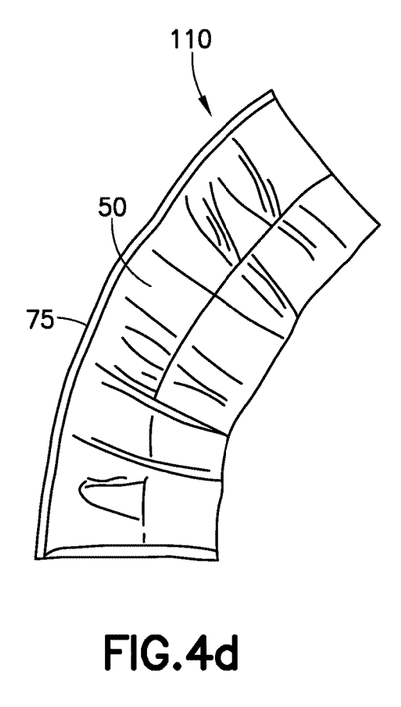

FIGS. 4b, 4c, and 4d show the robotic gripper finger 110 of FIG. 2f in representative states of actuation which are used for the plot of FIG. 4a. In FIG. 4b, the 6 and arrow indicate the change in position and the direction of movement of the gripper finger. It will be appreciated that FIG. 4c represents the transition location where the movement (displacement) increases at a greater rate relative to a change in pressure; i.e., the onset of buckling, while FIG. 4d represents a highly deformed gripper having distinct locally buckled regions and corresponds to the plateauing seen in FIG. 4a.

Figure 5A:
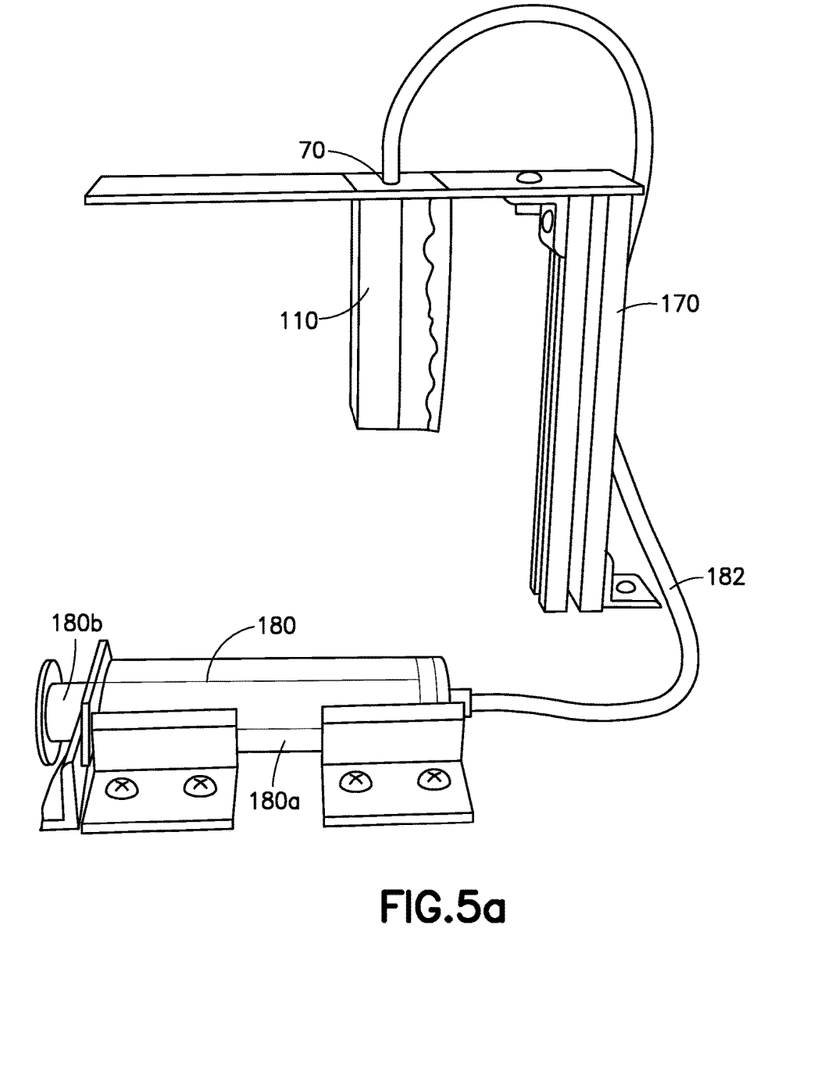
FIGS. 5a and 5b depict the end effector of FIG. 2f mounted to a stand and coupled to a source of negative pressure in an at-rest state and in an activated state.
Figure 5B:
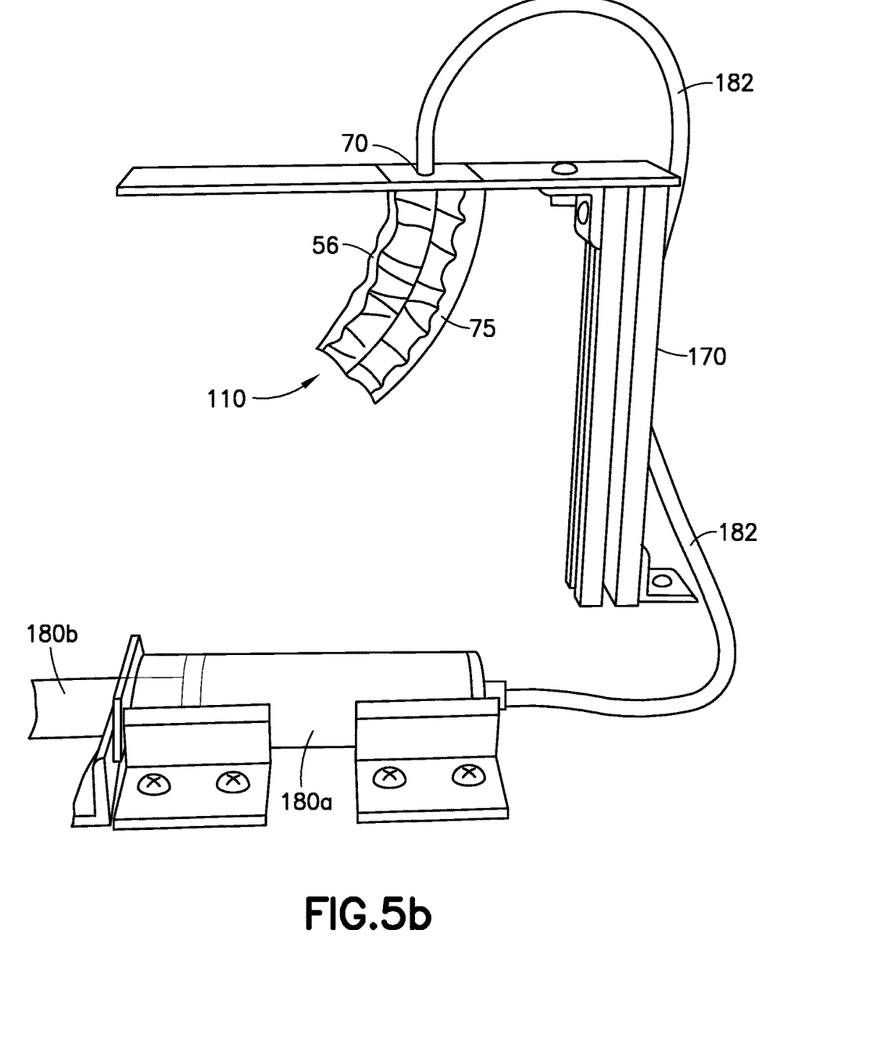

Turning to FIGS. 5a and 5b, the gripper finger 110 of FIG. 2f is shown mounted to a stand 170 and coupled to a source of negative pressure 180. In this case, the source of negative pressure (i.e., the evacuation source or evacuator) is a syringe including a barrel 180a and a plunger 180b, and tubing 182 which connects the syringe and the vacuum port 70 of the gripper finger 110. In FIG. 5a, the plunger 180b is shown fully inside the barrel 180a, and the gripper finger 110 is shown in an at-rest state. In FIG. 5b, the plunger 180b is withdrawn (pulled back) relative to the barrel 180a, evacuating air and creating a vacuum, and the gripper finger 110 is shown in its curved (bent) activated state with the inside of the finger 110 being a concave softer skin surface 56, and the relatively stiff, harder, solid layer 75 presenting a convex configuration.

Figure 6A:
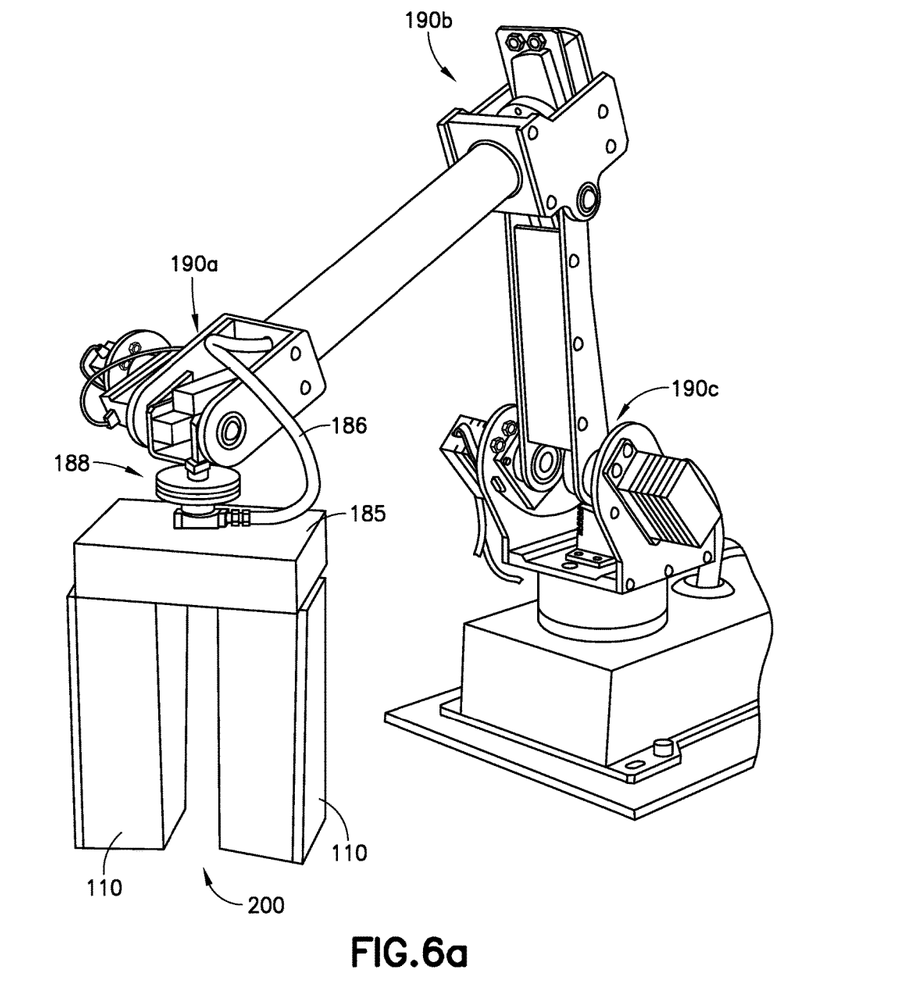
FIGS. 6a and 6b depict a robotic gripper end effector utilizing two gripper fingers of FIG. 2f in an at-rest state and in an actuated state gripping a cylindrical weight.
Figure 6B:
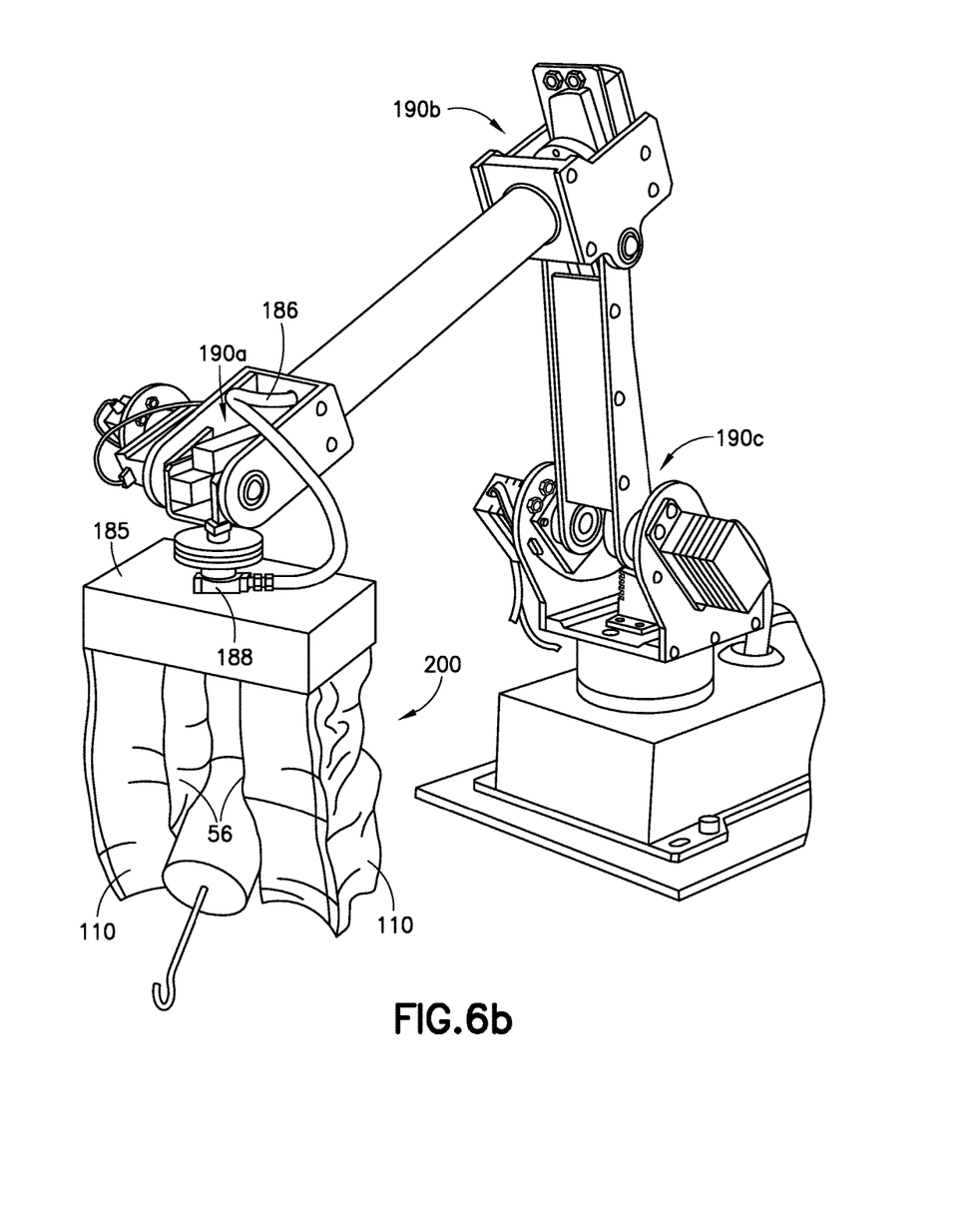

FIGS. 6a and 6b are photographs of a robotic gripper end effector or arm 200 utilizing two gripper fingers such as fingers 110 of FIG. 2f that are spaced from each other. In FIG. 6a, the fingers 110 are shown mounted to a solid (base) block 185. The solid block defines internal vacuum lines terminating on one end at the respective ports of the fingers 110 and on the other end in tubing 186. The tubing 186, in turn, is coupled to a single source of negative pressure (also called an "evacuator" or "suction device") which may be a pump/valve system in the base of the robotic arm. In FIG. 6a, the fingers are in an at-rest state; i.e., there is no differential pressure between the chambers in the fingers 110 and the external environment. In FIG. 6b, the fingers are activated by application of negative pressure and are shown gripping a 100 g weight between the skin surfaces 56 of the fingers 110.

The solid block 185 of the end effector 200 of FIGS. 6a and 6b, to which the fingers 110 are mounted may be rotationally mounted to a first rotator element 188 that is configured to rotate the block around a vertical axis defined between the fingers 110. In addition, end effector 200 may include additional rotational joints 190a, 190b, 190c, that permit the end effector to move as a robotic arm in multiple directions and planes. Multiple motors (not shown) are used under control of one or more processors (not shown) to effect movement of the fingers 110 to a desired location. Optical elements (not shown) may also be provided so that the end effector 200 may be used remotely.

According to one aspect, the fingers described herein may be used as a soft robotic gripper for "pick and place" applications having a high variability and/or sensitivity of objects. According to another aspect, the fingers described herein may have application for the subsea environment, where the maximum gripping force of the fingers may be increased greatly due to hydrostatic pressure.

Figure 7:
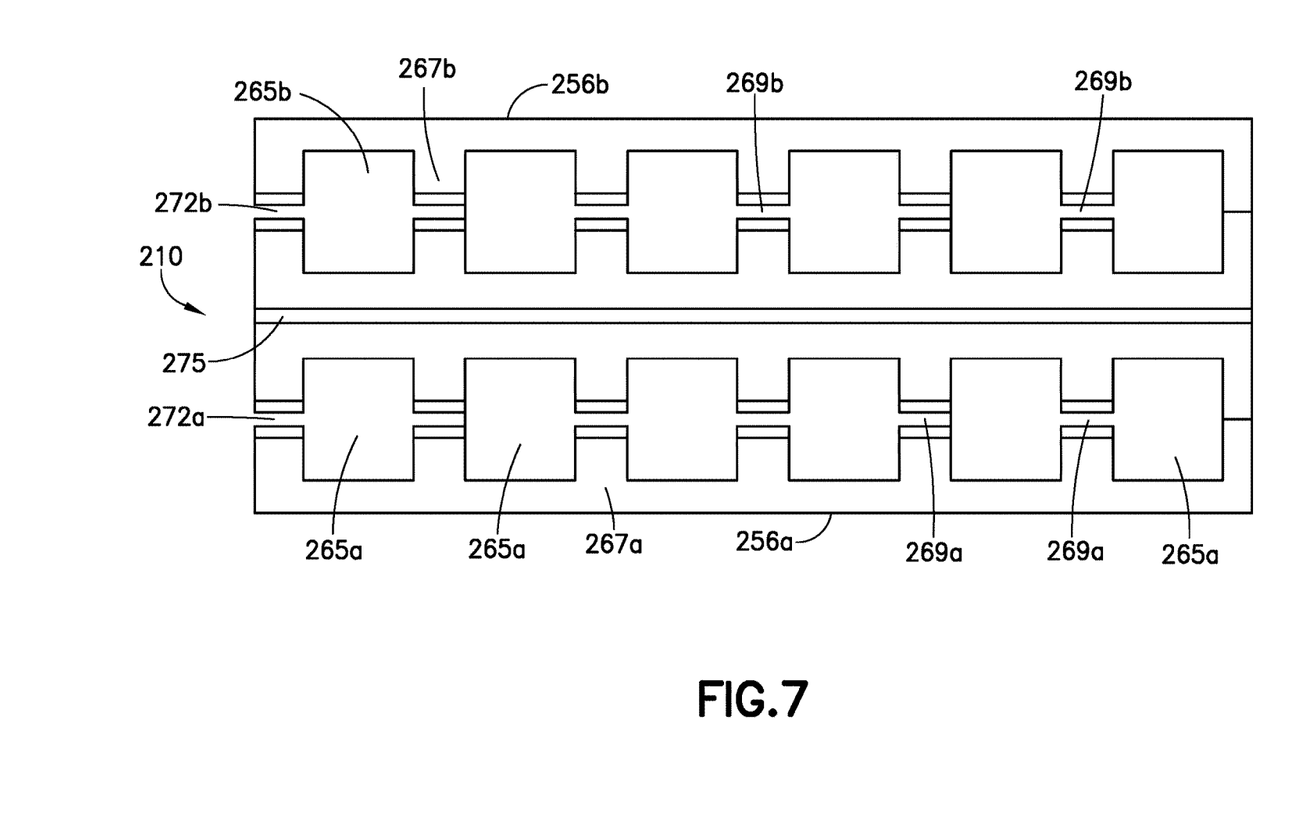
FIG. 7 is a schematic diagram of another embodiment of a soft robotic gripper finger.

FIG. 7 provides another embodiment of a soft robotic finger. Finger 210 is shown in cross-section as including a relatively stiff, harder, solid layer (sheet 275), and two relatively soft, compliant cellular layers 267a, 267b on either side of the harder layer. Each of the compliant cellular layers 267a, 267b defines interconnected rectangular voids or chambers surrounded by air tight solid outer walls and a skin 256 which may act as the gripping surface of the gripper finger 210. Each compliant layer each has its respective vacuum port 272a, 272b which is not in fluid connection with the other vacuum port. With the provided arrangement, the stiff layer is sandwiched between independent soft layers with bending of the finger 210 possible in either direction. Thus, the finger 210 may be caused to bend in the direction of compliant layer 267a by activating a vacuum (negative pressure) in the compliant layer 267a (while maintaining compliant layer 267b at zero differential pressure); or finger 210 may be caused to bend in the direction of compliant layer 267b by activating a vacuum in the compliant layer 267b, while maintaining compliant layer 267a at zero differential pressure.

In one embodiment, rather than arranging the chambers of the soft layer to have a main direction of maximum contraction aligned with the axial/long direction of the composite structure, the direction of maximum contraction may be arranged to be skewed from that axial direction. If the direction of maximum contraction is skewed from the axial direction but in the same plane, the overall structure will curl in two dimensions.

In one embodiment, the soft robotic fingers utilize silicone polymer materials of different Young's modulus. In other embodiments, other elastic materials such as vulcanized rubber, other silicone polymers, polydimethylsiloxanes (PDMS), etc., are used to fabricate the robotic fingers. Regardless of the materials utilized, in embodiments, the layer that is used to grip an item to be manipulated is less stiff than the backing layer.

The stiffnesses or elasticities of the elastomeric materials used for the backing and the soft gripper layer may range widely. By way of example, the stiffer layer may be formed with materials having a Young's modulus in the range of approximately 10,000 kPa to 200 kPa, such as 10,000 kPa, or 5,000 kPa, or 2,000 kPa, or 1,000 kPa, or 500 kPa or 200 kPa, or otherwise. Similarly, the more compliant cellular layer may be formed with materials having a Young's modulus in the range of approximately 5,000 kPa to 100 kPa, such as 5,000 kPa, or 2,000 kPa, or 1,000 kPa, or 500 kPa, or 200 kPa, or 100 kPa, or otherwise, it being appreciated that in embodiments, the more compliant cellular layer has a lower Young's modulus than the stiffer layer.

The relative thicknesses of the stiffer and more compliant layers may range widely. By way of example, depending upon the application and the materials being utilized, the stiffer layer may be approximately 1/1000 the thickness of the more compliant layer, 1/500 the thickness, 1/200 the thickness, 1/100, the thickness, 1/50 the thickness, 1/30 the thickness, 1/20 the thickness, 1/10 the thickness, 1/5 the thickness, 1/2 the thickness, and even the same thickness or thicker, or otherwise.

In embodiments, the voids in the soft compliant layer assume different geometries. The voids may be equal in size. The voids may include voids of different sizes. The voids may graduate in size in particular directions in the soft compliant layer to influence the bending. Similarly, the wall thicknesses of the columns and beams defining the voids may all be equal in thickness or may have different thicknesses. Also, the thickness of the gripping wall and the other outer walls of the soft compliant layer may be selected as desired.

In embodiments, the gripper finger may assume different overall sizes, including different thickness, widths, and lengths, and different ratios of thicknesses to widths to lengths. By way of example only, the gripper finger may be approximately 34 mm thick by 34 mm wide by 93 mm long.

Also, by way of example only, the gripper finger may have a length to width ratio of between 5:1 and 2:1.

In one aspect, the gripper finger described allows pressure to equilibrate as the internal pressure id decreased in the cellular structure.

In one aspect, the cellular solid of the gripper fingers described is designed such that a decreasing internal pressure causes a contraction in at least one direction which is aligned with the direction of the desired curvature.

In one aspect, two or more vacuum-activated elastic gripper fingers may be utilized as part of a robotic end effector.

In one aspect, the functioning of the apparatus described above, such as movement of the robotic arm on which the soft robotic finger(s) is/are located are performed by a processor. The term "processor" should not be construed to limit the embodiments disclosed herein to any particular device type or system. The processor may include a computer system. The computer system may also include a computer processor (e.g., a microprocessor, microcontroller, digital signal processor, or general purpose computer) for executing any of the methods and processes described above. The computer system may further include a memory such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), a PC card (e.g., PCMCIA card), or other memory device.

Some of the methods and processes described above, can be implemented as computer program logic for use with the computer processor. The computer program logic may be embodied in various forms, including a source code form or a computer executable form. Source code may include a series of computer program instructions in a variety of programming languages (e.g., an object code, an assembly language, or a high-level language such as C, C++, or JAVA). Such computer instructions can be stored in a non-transitory computer readable medium (e.g., memory) and executed by the computer processor. The computer instructions may be distributed in any form as a removable storage medium with accompanying printed or electronic documentation (e.g., shrink wrapped software), preloaded with a computer system (e.g., on system ROM or fixed disk), or distributed from a server or electronic bulletin board over a communication system (e.g., the Internet or World Wide Web).

Alternatively or additionally, the processor may include discrete electronic components coupled to a printed circuit board, integrated circuitry (e.g., Application Specific Integrated Circuits (ASIC)), and/or programmable logic devices (e.g., a Field Programmable Gate Arrays (FPGA)). Any of the methods and processes described above can be implemented using such logic devices.

Although only a few examples have been described in detail above, those skilled in the art will readily appreciate that many modifications are possible in the examples without materially departing from this subject disclosure. Thus, by way of example only, and not by way of limitation, while various embodiments describe a soft robotic finger having rectangular chambers, it will be appreciated that the chambers may be of different shapes. Also, while the described soft robotic fingers are described as having a central channel connecting the chambers for pressure equalization, it will be appreciated that equalization could be obtained by creating holes in the various columns and beams of the structure. In addition, while embodiments have been described as removing air from the soft robotic fingers in activating the fingers, it will be appreciated that the finger may have other fluids, including liquids in its voids, which other fluids may be removed to activate the bending of the fingers. In fact, the internal air or other fluid need not be the same as the air or fluid in the surrounding environment (i.e., the ambient). Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112, paragraph 6 for any limitations of any of the claims herein, except for those in which the claim expressly uses the words 'means for' together with an associated function.

What is claimed is:

1. A soft bending actuator finger for use in conjunction with an evacuator, comprising:
    a first layer of a first elastomeric material having an outer surface and an inner surface, said first elastomeric material being relatively stiff;
    a second layer of a second elastomeric material, said second elastomeric material being relatively compliant relative to said first elastomeric material, said second layer of elastomeric material having a plurality of walls including an outer surface and an inner engagement surface opposite said outer surface, said second layer of elastomeric material defining a plurality of interconnected voids creating pressure equalization of the voids in the second layer and a vacuum port in one of said plurality of walls of the second layer, the vacuum port being in fluid connection with the voids and adapted to be coupled to the evacuator, said second layer bonded to said first layer of elastomeric material along said outer surface of said second layer and said inner surface of said first layer,
    wherein, in a first configuration where said plurality of interconnected voids are maintained at a pressure equal to an ambient environment pressure, said soft bending actuator assumes a first position, and in a second configuration where said plurality of interconnected voids are maintained at a pressure below the ambient environment pressure, said soft bending actuator assumes a second, bent position.

2. The actuator finger of claim 1 wherein said outer surface of said first layer is curved in a convex configuration relative to said first configuration and said inner engagement surface of said second layer is curved in a concave configuration relative to said first configuration in said second bent position.

3. The actuator finger of claim 1, wherein the finger has a longitudinal axis and said second elastomeric material includes columns parallel the longitudinal axis and beams perpendicular said columns.

4. The actuator finger of claim 3, wherein said columns are thicker than said beams.

5. The actuator finger of claim 1, wherein said actuator finger has a length and width, with said length being longer than said width.

6. The actuator finger of claim 1, wherein said first layer is approximately 1/30 the thickness of said second layer.

7. The actuator finger of claim 1, further comprising a third layer of a third elastomeric material, said third elastomeric material being relatively compliant relative to said first elastomeric material, said third layer of elastomeric material having a plurality of walls including an outer surface and an inner engagement surface opposite said outer surface, said third layer of elastomeric material defining a plurality of interconnected voids creating pressure equalization of the voids in the third layer and a second vacuum port in one of said plurality of walls of the third layer, the second vacuum port being in fluid connection with the voids of the third elastomeric material and adapted to be coupled to the evacuator, said third layer bonded to said first layer of elastomeric material along said outer surface of said third layer and said outer surface of said first layer.

8. A robotic gripper end effector comprising at least two spaced soft bending actuator fingers according to claim 1, each having an end coupled to a base.

9. The robotic gripper end effector according to claim 8, wherein the inner engagement surfaces of the at least two actuator fingers face each other.

10. The robotic gripper end effector according to claim 8, further comprising a source of negative pressure coupled to said port of each actuation finger.

11. The robotic gripper end effector according to claim 10, wherein the base defines vacuum lines terminating on one end at respective said port of each actuation fingers and at a second end at a tube coupled to said source of negative pressure.

12. The robotic gripper of claim 8, wherein each finger has a longitudinal axis and said second elastomeric material of each finger includes columns parallel the longitudinal axis and beams perpendicular said columns.

13. The robotic gripper of claim 12, wherein said columns are thicker than said beams.

14. The robotic gripper of claim 8, wherein each said actuator finger has a length and width, with said length being longer than said width.

15. The robotic gripper of claim 8, wherein said first layer of each said actuator finger is approximately 1/30 the thickness of said second layer of each said actuator finger.

* * * * *